(12) United States Patent
Kuraki et al.

(10) Patent No.: US 8,270,037 B2
(45) Date of Patent: Sep. 18, 2012

(54) DIGITAL WATERMARK EMBEDDING APPARATUS AND DIGITAL WATERMARK DETECTING APPARATUS

(75) Inventors: Kensuke Kuraki, Kawasaki (JP); Shohei Nakagata, Kawasaki (JP); Hideaki Ishii, Fukuoka (JP); Motoo Masui, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 587 days.

(21) Appl. No.: 12/403,030

(22) Filed: Mar. 12, 2009

(65) Prior Publication Data
US 2009/0174910 A1 Jul. 9, 2009

Related U.S. Application Data

(63) Continuation of application No. PCT/JP2006/318539, filed on Sep. 19, 2006.

(51) Int. Cl.
*H04N 1/40* (2006.01)
(52) U.S. Cl. .................... 358/3.28; 382/100; 382/176
(58) Field of Classification Search .............. 358/3.28; 382/100, 176
See application file for complete search history.

(56) References Cited

U.S. PATENT DOCUMENTS

| | | | |
|---|---|---|---|
| 7,085,399 B2 * | 8/2006 | Suzaki | 382/100 |
| 2005/0025333 A1 * | 2/2005 | Fujii et al. | 382/100 |

FOREIGN PATENT DOCUMENTS

| | | |
|---|---|---|
| JP | 2001-144932 | 5/2001 |
| JP | 2001-346032 | 12/2001 |
| JP | 2002-305646 | 10/2002 |
| JP | 2003-101762 | 4/2003 |
| JP | 2003-209676 | 7/2003 |
| JP | 2004-289783 | 10/2004 |
| JP | 2006-5399 | 1/2006 |
| JP | 2006-42217 | 2/2006 |
| JP | 2006-121569 | 5/2006 |

OTHER PUBLICATIONS

International Search Report for International Application No. PCT/JP2006/318539, mailed Nov. 21, 2006.

\* cited by examiner

*Primary Examiner* — Twyler Haskins
*Assistant Examiner* — Michael Burleson
(74) *Attorney, Agent, or Firm* — Staas & Halsey LLP

(57) ABSTRACT

A plurality of background texture patterns each of which includes a region not having a dot and having a feature different from those of the other background texture patterns, are combined, and information is embedded in a background region of a document image. Then, a mathematical-morphology-based conversion is performed on the document image, and thereby a feature of a region not having a dot in each of the background texture patterns is extracted in order to identify the embedded information.

18 Claims, 24 Drawing Sheets

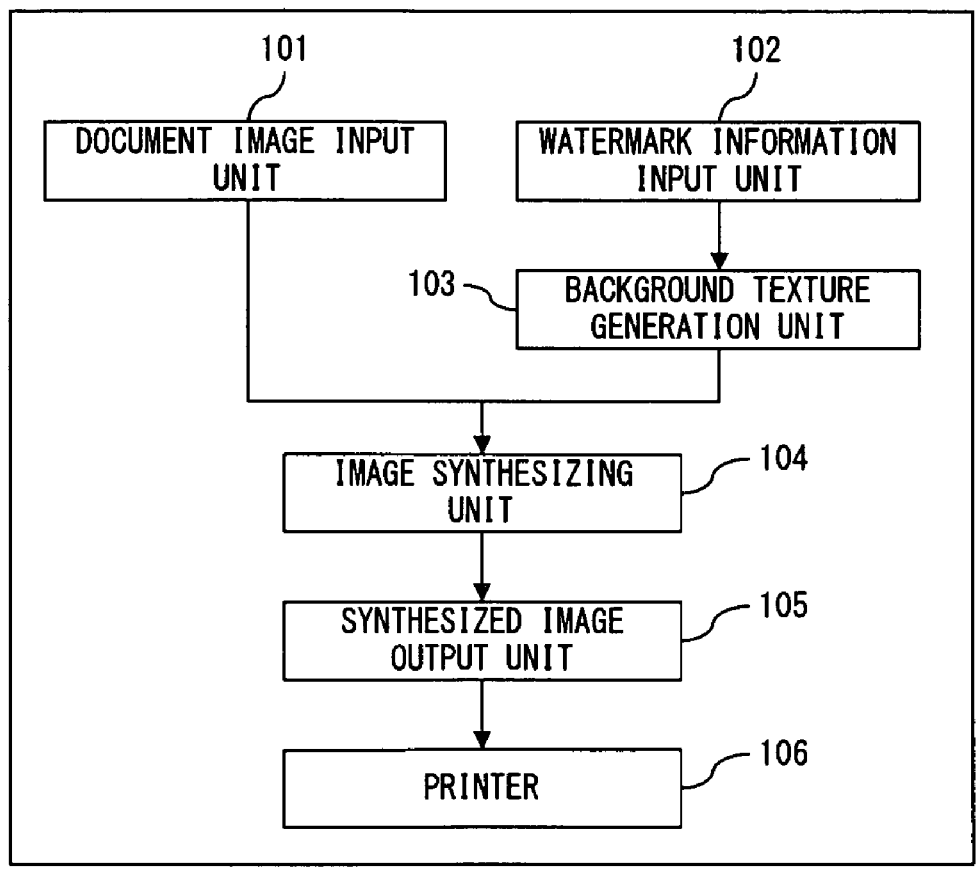
F I G. 1

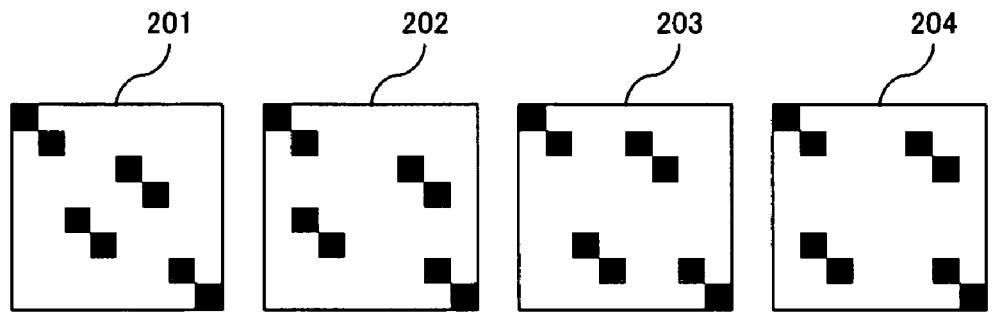
F I G. 2

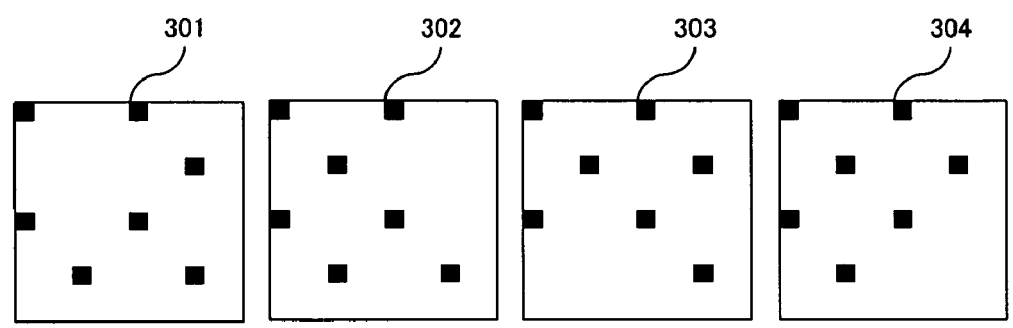
F I G. 3

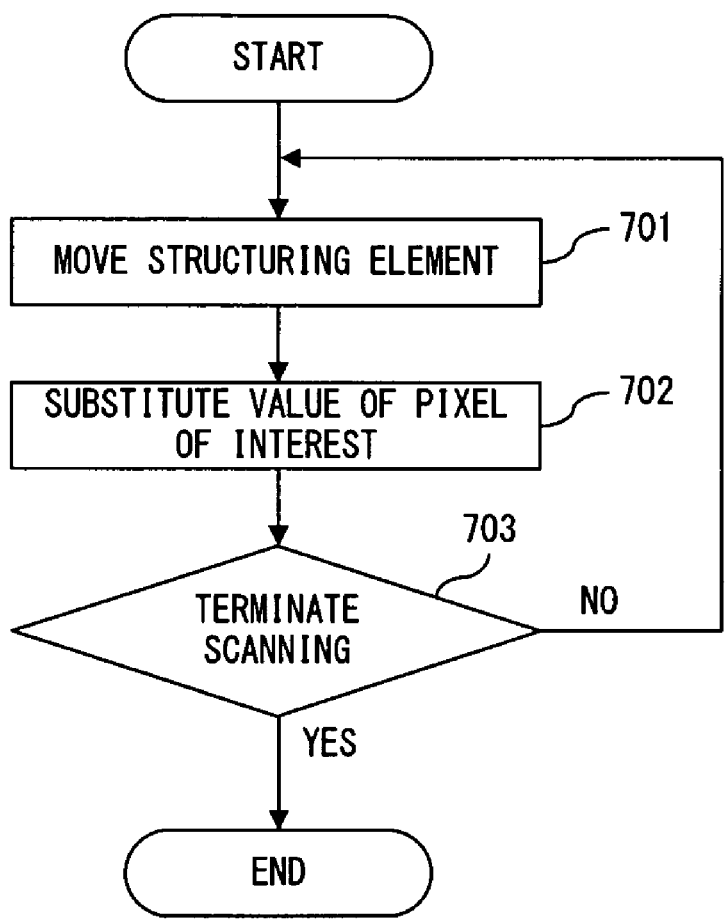
F I G. 7

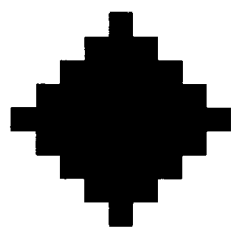
F I G. 1 4

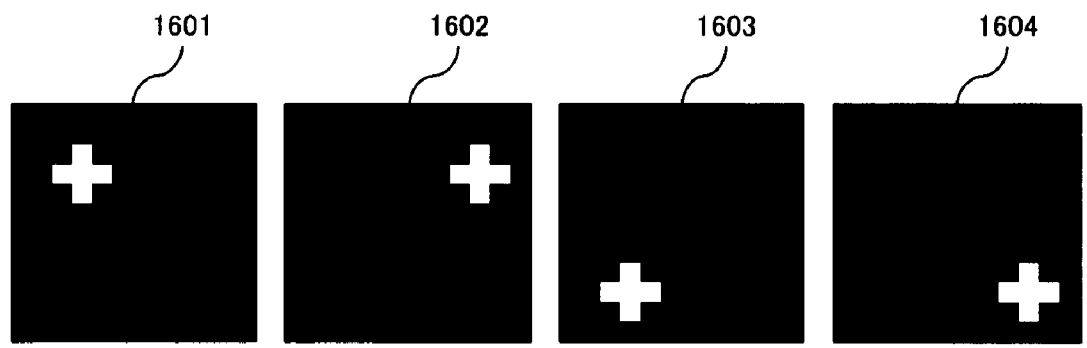
F I G. 16

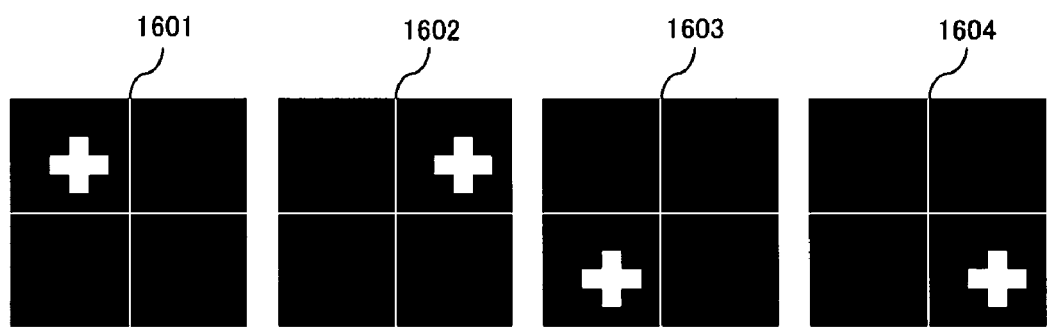
F I G. 1 7

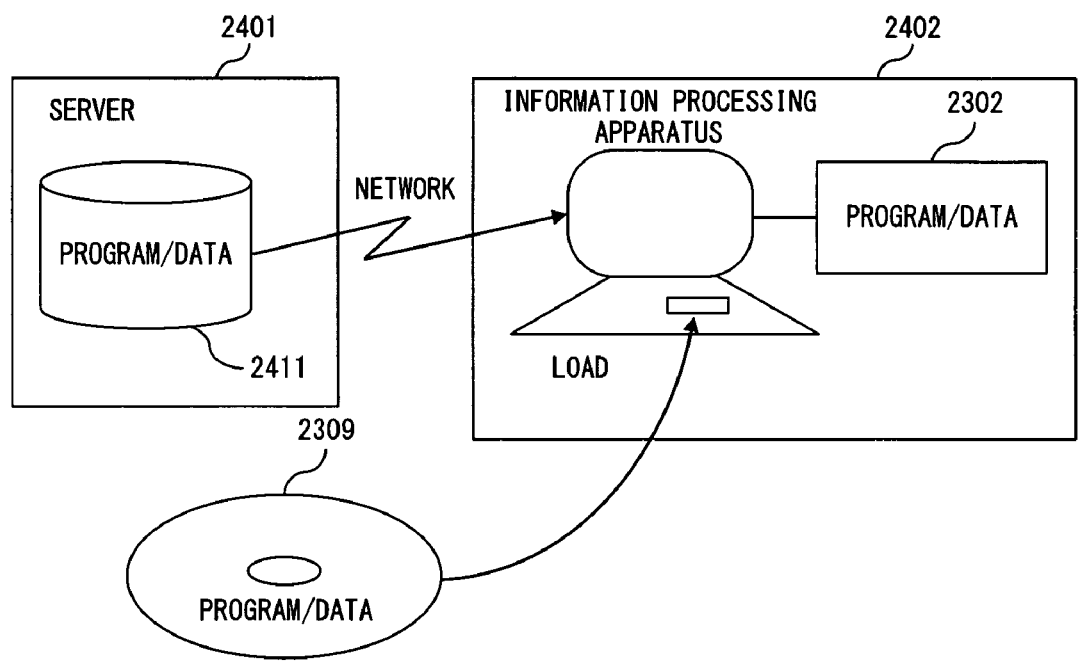
F I G. 2 4

DIGITAL WATERMARK EMBEDDING APPARATUS AND DIGITAL WATERMARK DETECTING APPARATUS

CROSS-REFERENCE TO RELATED APPLICATIONS

This application is a continuation of the PCT application PCT/JP2006/318539, which was filed on Sep. 19, 2006.

FIELD

The embodiments discussed herein are related to a digital watermark embedding apparatus that embeds information in document data in such a manner that the embedded information is not detected easily by human eyes, and also related to a digital watermark detecting apparatus that detects information embedded in document data.

BACKGROUND

In recent years, the digitalization of information managed and stored in business organizations has been increasingly promoted, and the practice of storing information in the paper media is expected to further decline in the future. However, this tendency does not mean the extinction of paper documents, and accordingly the current status is that the amount of paper documents is inevitably increasing, and digital documents and paper documents are managed together. Also, stricter information management systems need to be introduced in order to prevent the leakage of personal information such as customer information managed by business organizations or public institutions, etc.

As a security technique to cope with this situation, digital watermarking is proposed. Digital watermarking is a technique of embedding information such as the names of copyright holders, histories of copying, etc., in image data, document data, audio data, or the like. Embedding information in important data managed in offices or in products supplied from and used out of business organizations makes it possible to prevent the leakage and illegal copying of information and to secure the original data. For these reasons, research on digital watermarking for digital data has been widely conducted, and various products based on the digital watermarking techniques are produced.

However, it is difficult to extract embedded information from binary document data, particularly from the printed form of paper media. The reason for this is that embedded information is prone to be lost due to position deviations that can be caused during printing or scanning, the addition of noise, the loss of high-frequency components as a result of the resolution conversion, etc.

The technique of Patent Document 1 realizes both an improvement in image quality and the embedment of information by utilizing the characteristics of human eyes. However, this technique involves a high probability of losing embedded information in the case when outline portions of figures or characters fade or blur due to copying or when the resolution changes due to facsimile transmissions. The reason for this is that information is embedded mainly in the outlines of figures and characters or in the intervals between them. Additionally, the amount of information that can be embedded depends upon the number of characters.

Patent Documents 2 through 6 disclose techniques of using background texture patterns for digital watermarking. In the methods of Patent Documents 2 and 3, dots constituting background texture patterns are aligned in a particular direction in order to prevent the degradation of detection accuracy that would be caused by the addition of noise, the blurring of outline portions or the like due to printing, copying, or scanning of the paper media. However, these relatively simple background texture patterns can be detected easily by human eyes so that embedded information can be read by third persons and be misused.

In the method of Patent Document 4, the directions of background texture patterns are detected by using the technique of pattern matching, resulting in lower detection accuracy because of geometric deformation such as deformations caused in the process of being copied, etc. Also, the background texture patterns themselves are large, allowing third persons to visually understand the arrangement of the base patterns.

In the method of Patent Document 5, background texture patterns are embedded in document images in portions other than those containing characters. The technique of matching based on a plurality of types of filters is employed for the identification of the patterns. In the method of Patent Document 6, background texture patterns are generated by combining dots with different resolutions. When a paper document is copied, dots with high resolutions are not copied, whereas dots with low resolutions are copied, making it possible to produce documents that allow both the confirmation of the effect of the original document and the identification of the distribution routes.

In the methods of Patent Documents 5 and 6, directions of background texture patterns are detected by using filters. However, these methods involve the same defect as in the Patent Document 4, namely that the background texture patterns themselves are large, allowing third persons to visually understand the arrangement of the base patterns.

Patent Document 1:
Japanese Patent Application Publication No. 2004-289783
Patent Document 2:
Japanese Patent Application Publication No. 2001-346032
Patent Document 3:
Japanese Patent Application Publication No. 2003-101762
Patent Document 4:
Japanese Patent Application Publication No. 2002-305646
Patent Document 5:
Japanese Patent Application Publication No. 2003-209676
Patent Document 6:
Japanese Patent Application Publication No. 2006-005399

SUMMARY

A digital watermark embedding apparatus includes a document image input unit, a watermark information input unit, a background texture generation unit, an image synthesizing unit, and a synthesized image output unit. This digital watermark embedding apparatus embeds information in a background region of a document image by using a background texture pattern including a plurality of dots.

The document image input unit inputs a document image, and the watermark information input unit inputs information to be embedded. The background texture generation unit combines and arrays a plurality of background texture patterns in which a plurality of dots are arranged in such a manner that different features are extracted respectively from regions not having a dot in the plurality of background texture patterns, and thereby generates a sequence of background texture patterns expressing the information to be embedded. The image synthesizing unit embeds the sequence of the background texture patterns in the background region of the document image, and generates a synthesized image. The synthesized image output unit outputs the synthesized image.

A digital watermark detecting apparatus includes a document image input unit, a mathematical-morphology-based conversion unit, and an information identification unit. This digital watermark detecting apparatus detects information embedded in the background region of a document image by using a background texture pattern including a plurality of dots.

The document image input unit inputs the document image. The mathematical-morphology-based conversion unit performs a mathematical-morphology-based conversion on each of a plurality of background texture patterns constituting a background region of the document image, and thereby extracts a feature of a region not having a dot in each of the background texture patterns. The information identification unit identifies the information represented by each of the background texture patterns on the basis of the extracted feature.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a configuration of a digital watermark embedding apparatus;

FIG. 2 illustrates first background texture patterns;

FIG. 3 illustrates second background texture patterns;

FIG. 7 is a flowchart for a mathematical-morphology-based conversion process;

FIG. 14 illustrates a third structuring element;

FIG. 16 illustrates conversion results obtained when using the third structuring element;

FIG. 17 illustrates the division of conversion results into blocks;

FIG. 24 illustrates a provision of programs and data.

DESCRIPTION OF EMBODIMENTS

Figure 4:
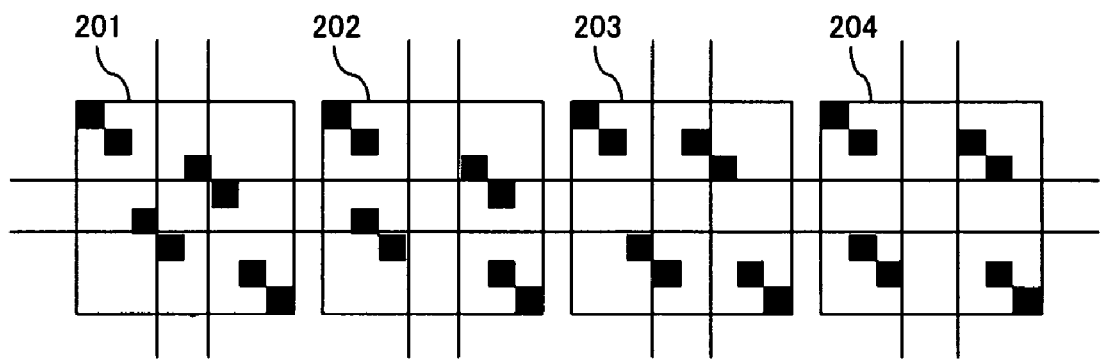
FIG. 4 illustrates blank portions in the first background texture patterns.

Preferred embodiments of the present invention will be explained with reference to accompanying drawings.

Features such as the number of the regions not having any dots or the shapes of such regions are different among a plurality of background texture patterns, and by extracting these features, the respective background texture patterns can be identified. These background texture patterns are arrayed in accordance with the contents of information to be embedded. A sequence of the background texture patterns is embedded in a background region of a document image.

The features of a region not having any dots are difficult to identify visually, resulting in a very low probability that the sequence of the embedded background texture patterns will be detected by human eyes.

Via a mathematical-morphology-based conversion, a structuring element is arranged around a pixel of interest, and the value of the pixel of interest is changed on the basis of values of pixels in the region corresponding to the domain of the structuring element. By sequentially scanning the respective pixels in a document image as the pixel of interest, the conversion result of the entire document image can be obtained. On the conversion result, the features of the regions not having any dots in the respective background texture patterns are reflected, and thus the information represented by the background texture patterns can be identified from the conversion results of the respective background texture patterns.

The identification method based on geographical-structure features of background texture patterns can cope with deformations, blurring of outline portions caused by copying or scanning, etc., realizing consistent detection of information even after copying, scanning, or the like.

The present embodiment employs a technique of digital watermarking that uses background texture patterns, and also employs the feature extraction algorithm utilizing the non-linear filter based on mathematical morphology for the identification of background texture patterns. In contrast to the conventional techniques that extract the directions of the arrangements of dots of the background texture patterns to identify embedded information, the extraction of the geographical-structure feature of background texture patterns based on the mathematical-morphology-based conversion makes it possible to identify information in the form of background texture patterns without directionality. Accordingly, background texture patterns that look similar to each other to the human eye can be used, reducing the risk of being read by third persons.

Also, information is identified on the basis of the geographic-structure features of background texture patterns, making this method capable of responding to deformations, blurring of outline portions due to copying and scanning, etc., unlike the methods based on pattern matching or the like. As a result, information can be detected consistently even in documents obtained by copying, scanning, etc.

Approximately 5 to 20 percent of one paper sheet is occupied with characters (black pixels), and accordingly background texture patterns can be embedded in the blank portions occupying the remaining 80 through 95 percent so as to allow the identification of "who" printed the sheet "when"

and "where" i.e., users' IDs, the dates of printing, and the like. Information can be embedded repeatedly, and accordingly the method can respond to the cutting off of a part of a document.

FIG. 1 illustrates an example of a configuration of a digital watermark embedding apparatus such as the one described above. This digital watermark embedding apparatus includes a document image input unit 101, a watermark information input unit 102, a background texture generation unit 103, an image synthesizing unit 104, a synthesized image output unit 105, and a printer 106.

The document image input unit 101 inputs binary or multiple-value document image data, and the watermark information input unit 102 inputs information (such as a user's ID, the date of printing, and the like) to be embedded in the document image. The background texture generation unit 103 generates a background texture pattern representing the input information. The image synthesizing unit 104 embeds the background texture pattern in a background region of the input document image in order to generate synthesized image data including the background texture pattern. The synthesized image output unit 105 outputs the synthesized image to the printer 106. The printer 106 prints the binary or multiple-value synthesized image.

The digital watermark embedding apparatus has a plurality of predetermined background texture patterns such as the patterns illustrated in FIGS. 2 and 3. These patterns correspond to the information to be embedded. Background texture patterns 201 through 204 in FIG. 2 respectively represent different symbols. Similarly, background texture patterns 301 through 304 respectively represent different symbols.

Figure 5:
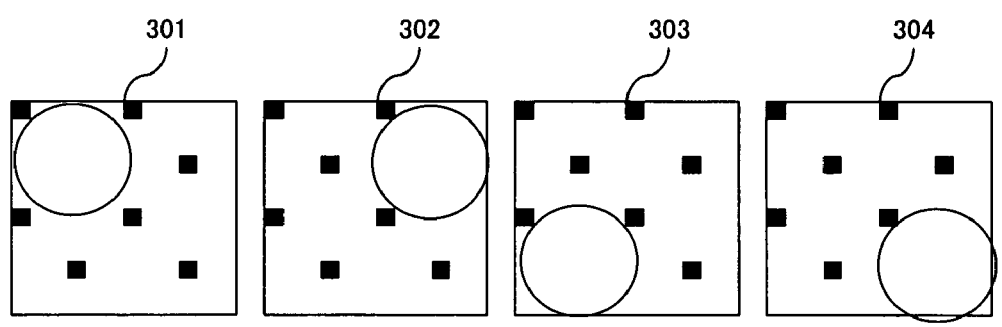
FIG. 5 illustrates blank portions in the second background texture patterns.

In each of these background texture patterns, a plurality of dots are arranged in such a manner that a blank portion having a feature different from those in the other patterns is formed as illustrated in FIGS. 4 and 5. The "feature of a blank portion or portions" includes the number, the area, the shape, the average value of the pixels, etc. of the blank portion or portions. Performing the mathematical-morphology-based conversion on the respective background texture patterns makes it possible to detect blank portions in the patterns.

Additionally, the same number of dots is desirably used to constitute each of the background texture patterns in order to form the entire document image with a consistent intensity, making it difficult to identify the background texture patterns by human eyes.

First, the watermark information input unit 102 inputs information consisting of a binary bit string. When this information is input, processes such as compression, encoding, error-detection coding, error-correcting coding, and the like can be performed on the input information. Next, the background texture generation unit 103 assigns the background texture patterns to the respective bits starting from the first bit of the bit string in order to convert the bit string into a background texture pattern string. For this assignment, one or more bits are handled as one symbol.

For example, when the background texture patterns 201 through 204 in FIG. 2 are assumed to respectively represent 00, 01, 10, and 11, the background texture patterns are assigned in units of two bits starting from the first bit of the bit string of the input information. It is also possible to assign the background texture patterns 301 through 304 in FIG. 3 to 00, 01, 10, and 11. The image synthesizing unit 104 repeatedly draws the background texture pattern string in the background portion of the document image.

Figure 6:
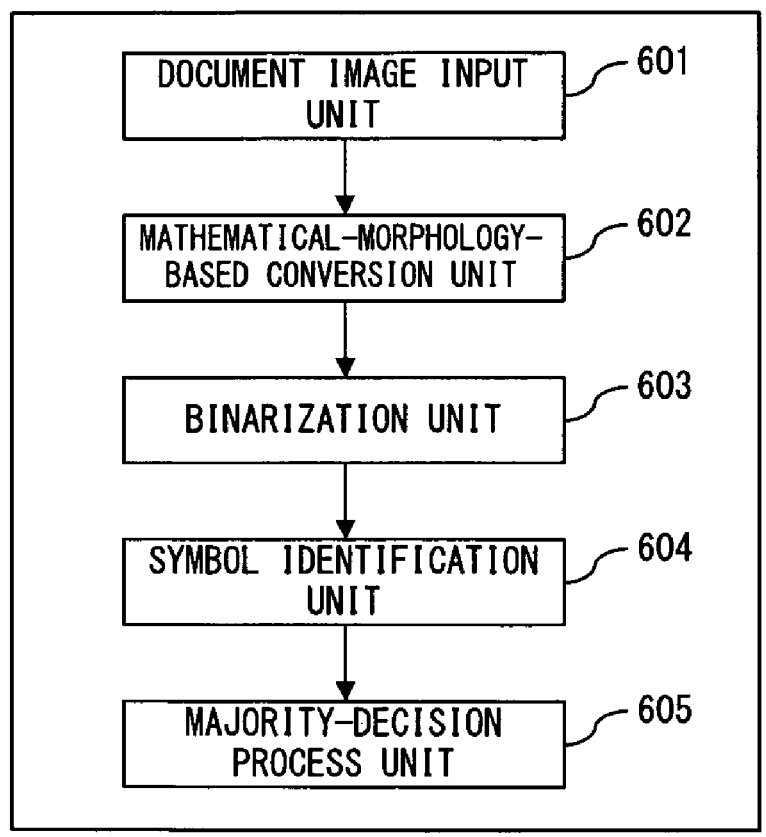
FIG. 6 illustrates a configuration of a digital watermark detecting apparatus.

FIG. 6 illustrates a configuration example of a digital watermark detecting apparatus that detects the background texture patterns embedded in the above manner. This digital watermark detecting apparatus includes a document image input unit 601, a mathematical-morphology-based conversion unit 602, a binarization unit 603, a symbol identification unit 604, and a majority-decision process unit 605.

The document image input unit 601 inputs document image data of a paper document printed by the digital watermark embedding apparatus, and the mathematical-morphology-based conversion unit 602 uses structuring elements to perform Raster scanning on the respective pixels in the input document image, and converts the values of the pixels. The binarization unit 603 binarizes the respective pixels using the threshold processing in order to convert the document image into a binary image when the document image is in the format of multiple values.

The symbol identification unit 604 identifies symbols represented by the background texture patterns included in the converted document image, and generates a symbol string. When background texture pattern strings are repeatedly embedded in the background portion of the document image, a plurality of symbol strings representing the same information are generated. Then, the majority-decision process unit 605 outputs, as a detection result, the highest-credibility symbol string on the basis of the majority decision for each symbol of the symbol strings.

It is also possible to convert the document image after changing the order of the mathematical-morphology-based conversion unit 602 and the binarization unit 603. As a threshold value for the binarization, a fixed value that is preset as a parameter or a value dynamically obtained from the input image using discriminant analysis can be used.

FIG. 7 is a flowchart for a mathematical-morphology-based conversion process performed by the mathematical-morphology-based conversion unit 602. In this process, the erosion process, which is a type of mathematical-morphology-based conversion process, is performed in order to detect, in the respective background texture patterns, blank portions having different shapes.

When the Minkowski sum or the Minkowski difference between sets A and B is obtained on the basis of mathematical morphology, set B for set A as a figure of the process target is referred to as a structuring element. Structuring elements can be handled as matrices or functions, and they are handled as matrices in the present embodiment. Structuring elements can be expressed as small regions having particular shapes in view of the visual aspect.

The erosion process is an operation of arranging a structuring element around the pixel of interest in an image, obtaining the brightness of the pixels in a region corresponding to the domain of the structuring element, and replacing the brightness of the pixel of interest with the minimum value of the brightness of the pixels.

The mathematical-morphology-based conversion unit 602 first selects the center or the like of the structuring element as the reference point, and arranges the structuring element in such a manner that the reference point is superposed on the pixel of interest in the document image (step 701). Next, the mathematical-morphology-based conversion unit 602 obtains the brightness of the pixels in the domain of the structuring element, and replaces the brightness of the pixel of interest with the minimum value of the pixels (step 702). Then, it is checked whether or not the erosion process has been performed on all the pixels in the document image (step 703). When there is a pixel that has not been processed, the reference point of the structuring element is moved to the next pixel (step 701), and the process of step 702 is performed. These steps are repeated on all the pixels in the document image.

Figure 8:
FIG. 8 illustrates a first structuring element.
Figure 9:
FIG. 9 illustrates a second structuring element.

When, for example, blank portions enclosed by straight lines as illustrated in FIG. 4 are to be extracted from the four background texture patterns shown in FIG. 2, two rectangular structuring elements as shown in FIGS. 8 and 9 are used to perform the erosion process.

In this case, the document image is a binary image. Accordingly, when there is at least one black pixel in the domain of a structuring element, the pixel of interest is replaced with a black pixel corresponding to the minimum value of the brightness, and when there is no black pixel in the domain of the structuring element, the pixel of interest is left as a white pixel.

Figure 10:
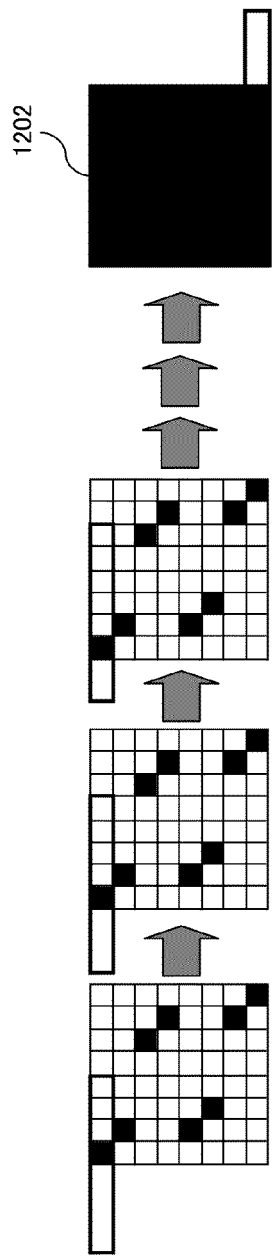
FIG. 10 illustrates a mathematical-morphology-based conversion process using the first structuring element.

First, when the erosion process is performed on the background texture pattern 202 illustrated in FIG. 2 by using the horizontal structuring element illustrated in FIG. 8, a conversion result 1202 that is a result of replacing the entire background texture pattern 202 with black pixels is obtained as shown in FIG. 10.

Next, when the erosion process is performed on the background texture pattern 202 by using the vertical structuring element shown in FIG. 9, a conversion result 1302 including the vertical blank portion illustrated in FIG. 4 is obtained. Thereby, the structuring element illustrated in FIG. 9 is used so as to detect a blank portion in the background texture pattern 202.

Figure 12:
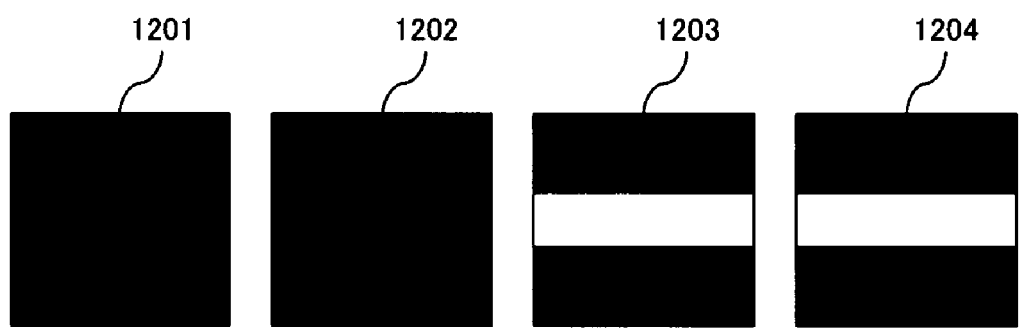
FIG. 12 illustrates conversion results obtained when using the first structuring element.

An erosion process similar to that in FIG. 10 performed on the background texture patterns 201, 203, and 204 illustrated in FIG. 2 results in conversion results 1201, 1203, and 1204 as illustrated in FIG. 12. The blank portions can be detected in the background texture patterns 203 and 204 by using the structuring element shown in FIG. 8.

Figure 11:
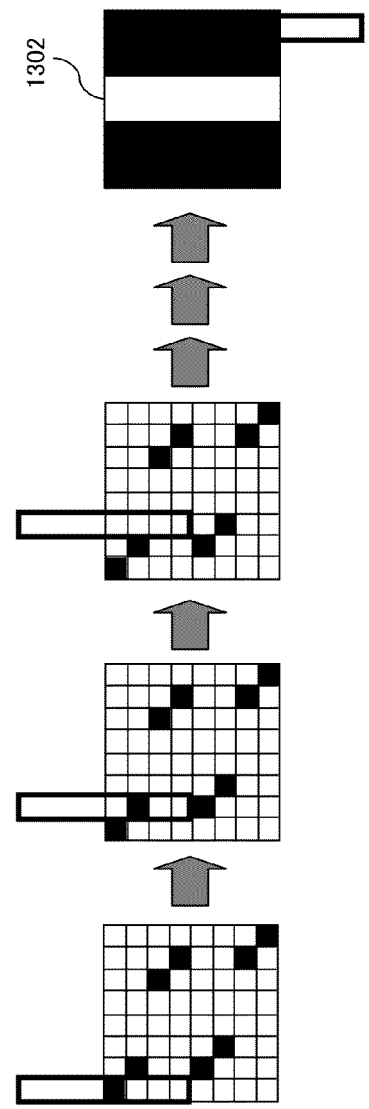
FIG. 11 illustrates a mathematical-morphology-based conversion process using the second structuring element.
Figure 13:
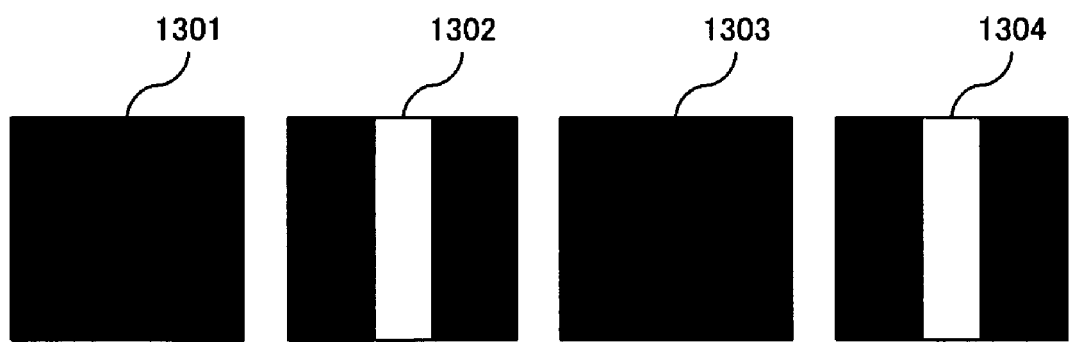
FIG. 13 illustrates conversion results obtained when using the second structuring element.

Also, an erosion process similar to that in FIG. 11 performed on the background texture patterns 201, 203, and 204 illustrated in FIG. 2 results in conversion results 1301, 1303, and 1304 as illustrated in FIG. 13. The blank portions can be detected in the background texture pattern 204 by using the structuring element illustrated in FIG. 9.

The symbol identification unit 604 combines the thusly obtained two types of conversion results for the entire document image, and identifies the symbol represented by the background texture pattern. Specifically, the symbol is identified on the basis of the presence or absence of a blank portion in the two types of conversion results in one and the same background texture pattern region.

For example, the symbol is determined to be 00 when none of the results includes a blank portion, as is indicated by the combination of conversion results 1201 and 1301, and the symbol is determined to be 01 when only the conversion result based on the structuring element in FIG. 9 includes a blank portion, as is indicated by the combination of the conversion results 1202 and 1302.

Also, when only the conversion result based on the structuring element in FIG. 8 includes a blank portion, as is indicated by the combination of conversion results 1203 and 1303, the symbol is determined to be 10, and when both of the results include blank portions, as is indicated by the combination of conversion results 1204 and 1304, the symbol is determined to be 11. The information embedded in a document image is detected on the basis of the sequence of the symbols detected in this manner.

Alternatively, the combination of the conversion results based on three or more structuring elements can be used to identify symbols.

Next, an explanation will be given to a case where blank portions enclosed by circles as illustrated in FIG. 5 are to be detected in the four background texture patterns illustrated in FIG. 3. In this case, a rhombic structuring element as illustrated in FIG. 14 is used to perform the erosion process.

Figure 15:
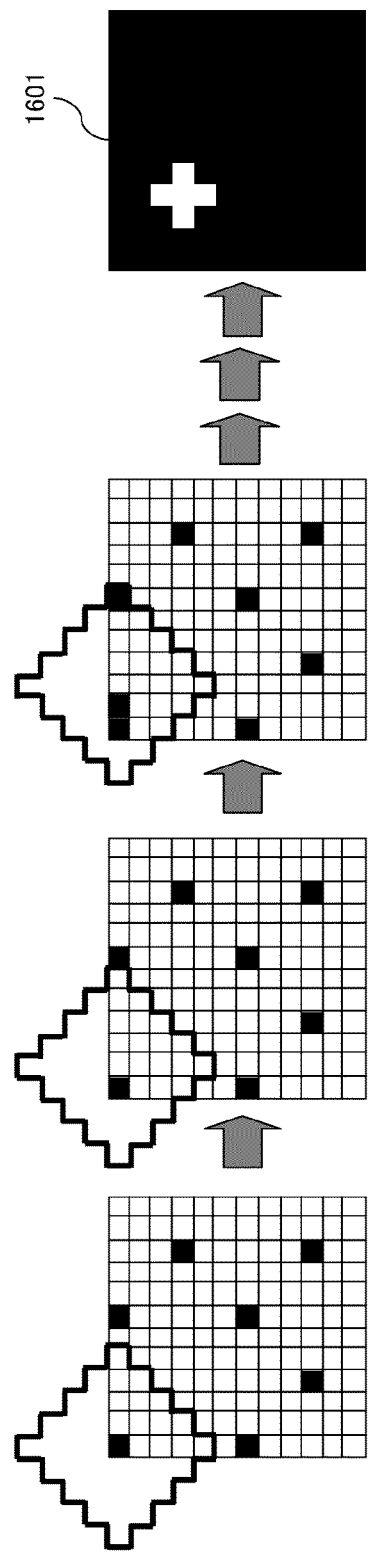
FIG. 15 illustrates a mathematical-morphology-based conversion process using the third structuring element.

As illustrated in FIG. 15, the erosion process performed on the background texture pattern 301 in FIG. 3 using the structuring element illustrated in FIG. 14 causes conversion result 1601, including the blank portion illustrated in the upper left portion of FIG. 5. Similarly, conversion results 1602 through 1604 as illustrated in FIG. 16 are obtained from the background texture patterns 302 through 304.

From these conversion results, the blank portions smaller than a prescribed size and in the background texture patterns 301 through 304 are changed to black so that only the blank portions larger than the prescribed size can be detected by using the structuring element illustrated in FIG. 14.

The symbol identification unit 604 identifies the symbols represented by the background texture patterns on the basis of the position information of the blank portions in the respective background texture pattern regions, by using the conversion results of the entire document image.

Specifically, each of the background texture pattern regions is divided into a plurality of blocks (M×N blocks for example), and the symbol represented by the background texture pattern is identified on the basis of the number of blank portions included in each block. In the case illustrated in FIG. 16, each background texture pattern is divided into 2×2 blocks as illustrated in FIG. 17, and the symbols are identified from the positions of the blocks including blank portions.

For example, when the upper left block includes a blank portion (indicated by conversion result 1601), the symbol is determined to be 00. When the upper right block includes a blank portion (indicated by conversion result 1602), the symbol is determined to be 01. When the bottom left block includes a blank portion (indicated by conversion result 1603), the symbol is determined to be 10. When the bottom right block includes a blank portion (indicated by conversion result 1604), the symbol is determined to be 11. The information embedded in the document image is detected on the basis of the sequence of thus detected symbols.

Figure 18:
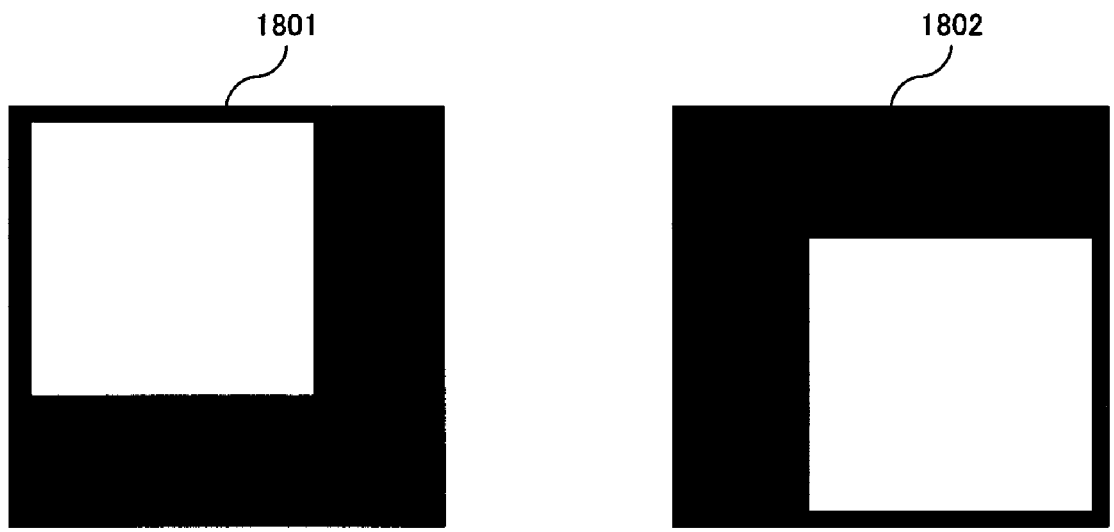
FIG. 18 illustrates conversion results that cannot be identified by the division of conversion results into blocks.

However, when conversion results 1801 and 1802 as illustrated in FIG. 18 are obtained, all the blocks made by the 2×2 division will include a blank portion, preventing the identification of symbols. In order to cope with this situation, the position coordinates of the blank portions included in the conversion result are obtained in order to identify the symbol on the basis of the coordinate values. As an example of the position coordinates, coordinate values of the vertex or the center point of a blank portion are used.

Further, symbols represented by background texture patterns can be identified on the basis of combinations of the position information of blank portions in a plurality of conversion results by using the erosion process of structuring elements other than the structuring element illustrated in FIG. 14.

In the above described embodiment, a single background texture pattern represents one symbol. However, a plurality of background texture patterns can be combined to represent one symbol.

Figure 19:
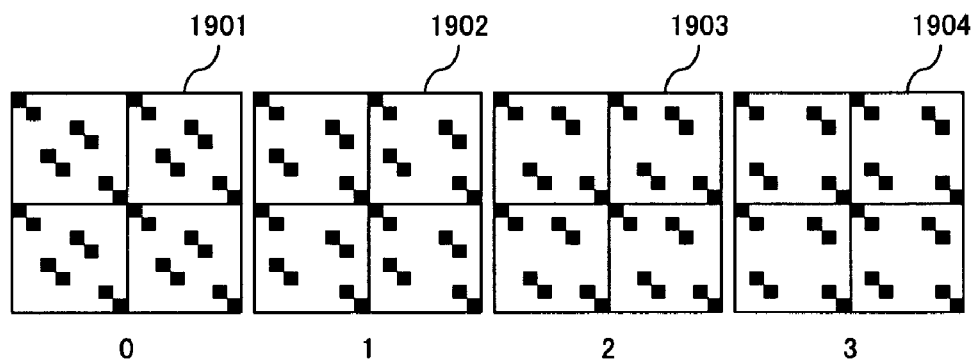
FIG. 19 illustrates first combined background texture patterns.

For example, four identical background texture patterns can be combined to form one combined background texture pattern in such a manner that combined background texture patterns 1901 through 1904 respectively representing symbols 0 through 3 are formed, as illustrated in FIG. 19. By repeatedly using the same background texture patterns, the embedded information can be used for error corrections and the like.

Figure 20:
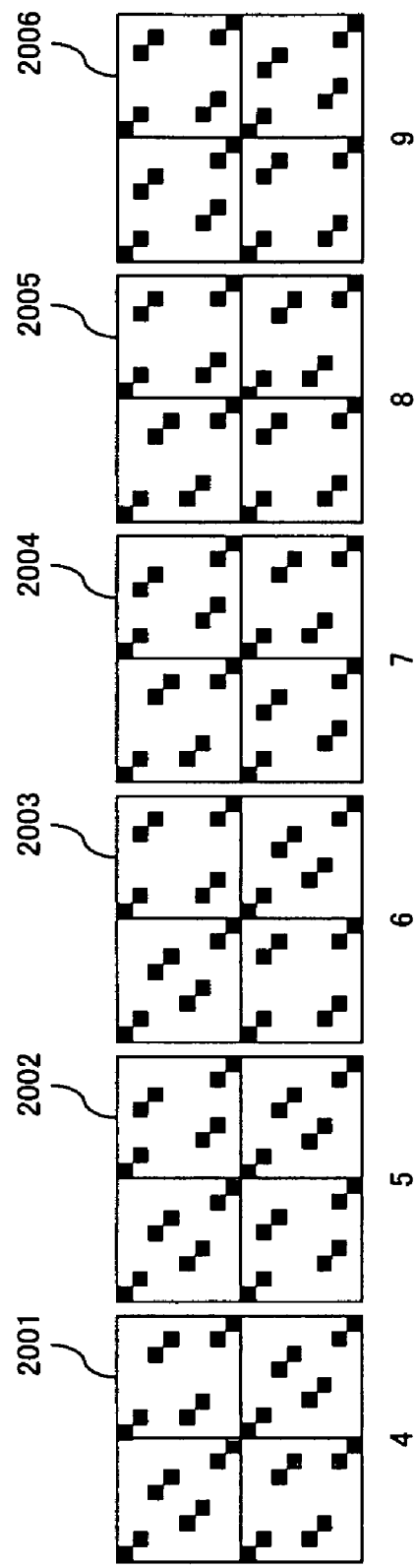
FIG. 20 illustrates second combined background texture patterns.

As illustrated in FIG. 20, four different background texture patterns can be combined to form a single combined background texture pattern so that combined background texture patterns 2001 through 2006 respectively representing symbols 4 through 9 are formed. Combining different background texture patterns makes it possible to express information different from that in FIG. 19.

According to the mathematical-morphology-based conversion process, black portions with a low brightness can be extracted instead of the blank portions of background texture patterns. When each background texture pattern includes a black portion having features different from those included in the other background texture patterns, the embedded information can be detected by extracting the black portions in the patterns.

Figure 21:
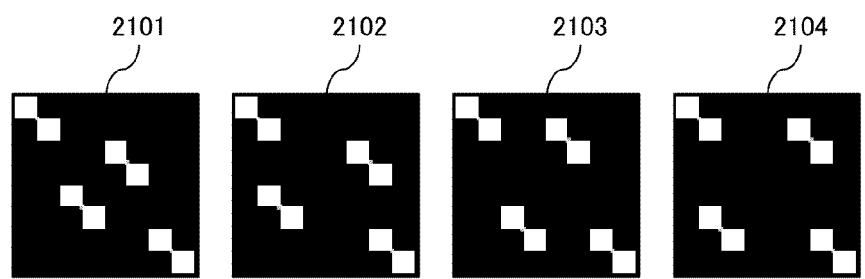
FIG. 21 illustrates first reversed background texture patterns.
Figure 22:
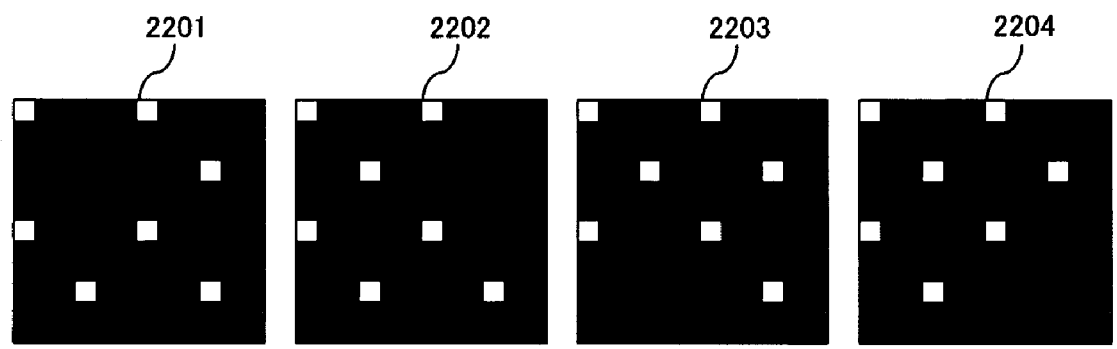
FIG. 22 illustrates second reversed background texture patterns.

FIGS. 21 and 22 illustrate an example of a background texture pattern obtained in the above method. Background texture patterns 2101 through 2104 illustrated in FIG. 21 are obtained by reversing the two colors (black and white) in background texture patterns 201 through 204 illustrated in FIG. 2. Background texture patterns 2201 through 2204 illustrated in FIG. 22 are obtained by reversing the two colors (black and white) in background texture patterns 301 through 304 illustrated in FIG. 3.

When black portions are to be detected in these background texture patterns, the dilation process is performed instead of the erosion process in the mathematical-morphology-based conversion process shown in FIG. 7. The dilation process is an operation of arranging a structuring element around the pixel of interest in an image, obtaining the brightness of the pixels in the region corresponding to the domain of the structuring element, and replacing the brightness of the pixel of interest with the maximum value of the brightness of the pixels.

Figure 23:
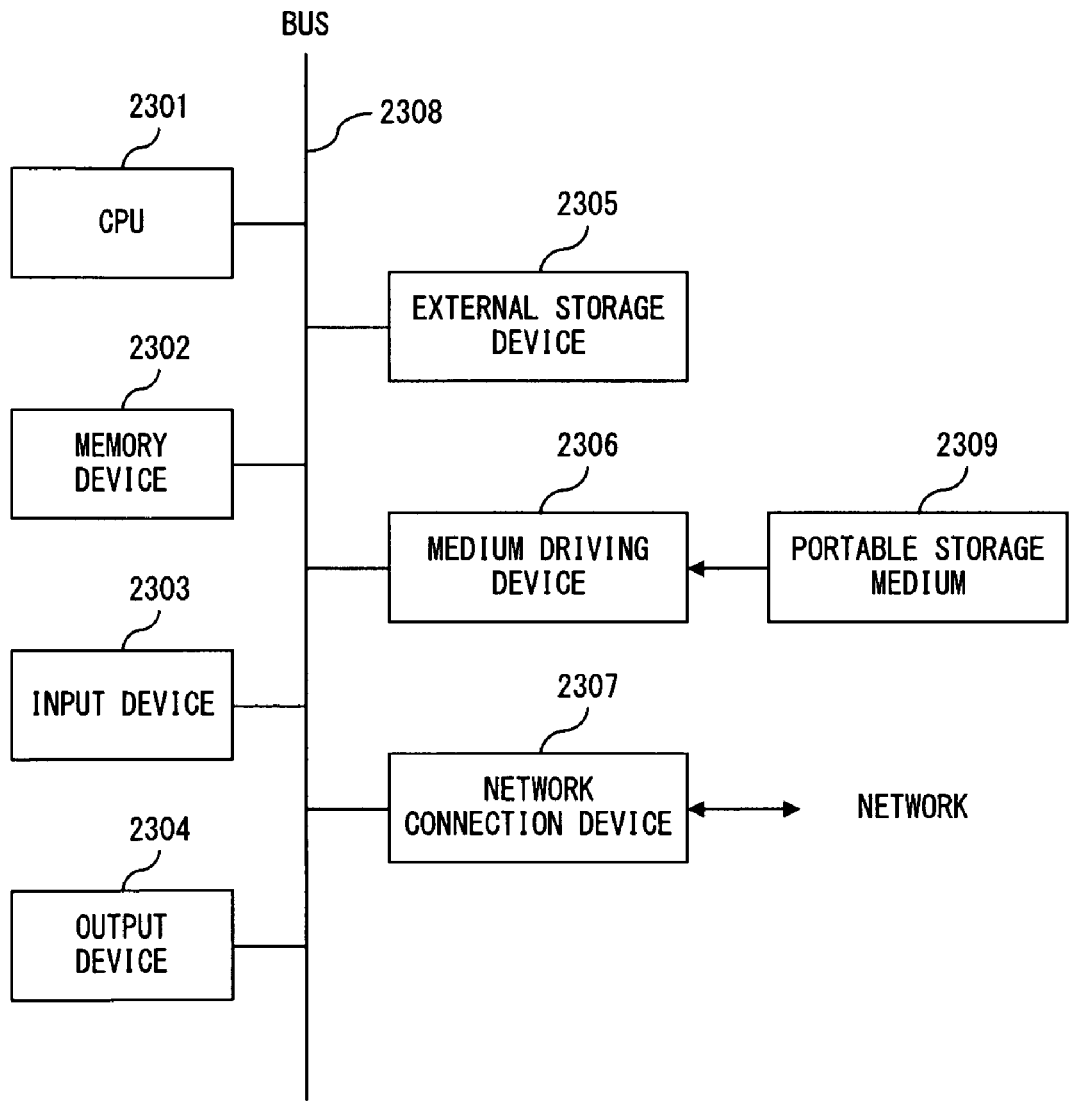
FIG. 23 illustrates a configuration of information processing apparatus.

The digital watermark embedding apparatus illustrated in FIG. 1 and the digital watermark detecting apparatus illustrated in FIG. 6 are implemented by information processing apparatus (computer) as illustrated in, for example, FIG. 23. The information processing apparatus shown in FIG. 23 includes a CPU (Central Processing Unit) 2301, a memory device 2302, an input device 2303, an output device 2304, an external storage device 2305, a medium driving device 2306, and a network connection device 2307, which are all connected to one another via a bus 2308.

Examples of the memory device 2302 are a ROM (Read Only Memory) device, a RAM (Random Access Memory) device, and the like, and they are for storing programs and data used for executing the above processes. The CPU 2301 executes the programs using the memory device 2302 in order to execute the above processes.

The document image input unit 101, the watermark information input unit 102, the background texture generation unit 103, the image synthesizing unit 104, and the synthesized image output unit 105 illustrated in FIG. 1 and the document image input unit 601, the mathematical-morphology-based conversion unit 602, the binarization unit 603, the symbol identification unit 604, and the majority-decision process unit 605 illustrated in FIG. 6 correspond to the CPU 2301 executing the programs stored in the memory device 2302.

Examples of the input device 2303 are a keyboard, a pointing device, and the like, and they are used for inputting instructions or information from operating persons. Examples of the output device 2304 are a display device, a printer, a speaker, and the like, and they are for outputting questions and processing results to operating persons.

Examples of the external storage device 2305 are a magnetic disk device, an optical disk device, a magneto-optical disk device, a tape device, and the like. The information processing apparatus stores programs and data in the external storage device 2305, and loads them to the memory device 2302 in order to use them as necessary.

The medium driving device 2306 drives a portable storage medium 2309 in order to access the storage contents of the portable storage medium 2309. The portable storage medium 2309 is an arbitrary computer-readable storage medium such as a memory card, a flexible disk, an optical disk, a magneto-optical disk, or the like. Operating persons store programs and data in the portable storage medium 2309, and load them into the memory device 2302 in order to use them as necessary.

The network connection device 2307 is connected to a communications network such as a LAN (Local Area Network) or the like, and performs data conversion necessary for communications. The information processing apparatus receives programs and data from external devices via the network connection device 2307, and loads them into the memory device 2302 in order to use them as necessary.

FIG. 24 illustrates a manner of providing programs and data to the information processing apparatus illustrated in FIG. 23. The programs and data stored in the portable storage medium 2309 and database 2411 in a server 2401 are loaded into the memory device 2302 in information processing apparatus 2402. The server 2401 generates carrier signals for carrying the programs and data, and transmits the data to the information processing apparatus 2402 via an arbitrary transmission medium on the communications network. The CPU 2301 uses the data to execute the programs and executes the above processes.

According to the disclosed embodiments, information embedment and information extraction that can cope with the image degradation caused by printing, copying, and scanning of documents are realized. Also, the difficulty in reading embedded information can be enhanced. Thereby, illegal copying of paper media containing important information in a printed form can be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable storage medium storing a program for a computer used for embedding information in a background region of a document image by using a background texture pattern including a plurality of dots, the program causing the computer to execute a process comprising:

combining and arraying a plurality of background texture patterns in which a plurality of dots are arranged in such a manner that different features are extracted respectively from regions not having a dot, and thereby generating a sequence of background texture patterns expressing information to be embedded; and embedding the sequence of the background texture patterns in the background region of the document image, and generating a synthesized image.

2. The storage medium according to claim 1, wherein:
numbers or shapes of the regions not having a dot are different among the plurality of background texture patterns.

3. The storage medium according to claim 1, wherein:
each of the plurality of background texture patterns represents one symbol.

4. The storage medium according to claim 1, wherein:
a combination of at least two of the plurality of background texture patterns represents one symbol.

5. The storage medium according to claim 1, wherein:
each of the plurality of background texture patterns includes the same number of dots.

6. A non-transitory computer-readable storage medium storing a program for a computer used for detecting information embedded in a background region of a document image by using a background texture pattern including a plurality of dots, the program causing the computer to execute a process comprising:
performing a mathematical-morphology-based conversion on each of a plurality of background texture patterns constituting the background region of the document image, and thereby extracting a feature of a region not having a dot in each of the background texture patterns; and
identifying information represented by each of the background texture patterns on the basis of the extracted feature.

7. The storage medium according to claim 6, wherein:
the performing the mathematical-morphology-based conversion performs the mathematical-morphology-based conversion while scanning the document image by using a prescribed structuring element, and the identifying information identifies the information represented by each of the background texture patterns on the basis of whether or not a conversion result of each of the background texture patterns includes a region not having a dot.

8. The storage medium according to claim 7, wherein:
the performing the mathematical-morphology-based conversion performs the mathematical-morphology-based conversion while scanning the document image by using a plurality of structuring elements, and thereby generating a plurality of conversion results of each of the background texture patterns, the identifying information identifies the information represented by each of the background texture patterns by combining the plurality of conversion results of each of the background texture patterns.

9. The storage medium according to claim 6, wherein:
the performing the mathematical-morphology-based conversion performs the mathematical-morphology-based conversion while scanning the document image by using a prescribed structuring element, and thereby extracting a region not having a dot from each of the background texture patterns, and the identifying information identifies the information represented by each of the background texture patterns on the basis of position information of the extracted region in each of the background texture patterns.

10. The storage medium according to claim 9, wherein:
the identifying information divides a conversion result of each of the background texture patterns into a plurality of blocks, and obtaining the position information on the basis of a number of regions not having a dot included in each of the blocks.

11. The storage medium according to claim 9, wherein:
the performing the mathematical-morphology-based conversion performs the mathematical-morphology-based conversion while scanning the document image by using a plurality of structuring elements, and thereby generating a plurality of conversion results of each of the background texture patterns, the identifying information identifies the information represented by each of the background texture patterns by combining the plurality of conversion results of each of the background texture patterns.

12. A digital watermark detecting apparatus for detecting information embedded in a background region of a document image by using a background texture pattern including a plurality of dots, the digital watermark detecting apparatus comprising:
a document image input unit configured to input the document image;
a mathematical-morphology-based conversion unit configured to perform a mathematical-morphology-based conversion on each of a plurality of background texture patterns constituting the background region of the document image, and thereby extracting a feature of a region not having a dot in each of the background texture patterns; and
an information identification unit configured to identify information represented by each of the background texture patterns on the basis of the extracted feature.

13. The digital watermark detecting apparatus according to claim 12, wherein:
the mathematical-morphology-based conversion unit performs a mathematical-morphology-based conversion while scanning the document image by using a prescribed structuring element; and
the information identification unit identifies information represented by each of the background texture patterns on the basis of whether or not a conversion result of each of the background texture patterns includes a region not having a dot.

14. The digital watermark detecting apparatus according to claim 13, wherein:
the mathematical-morphology-based conversion unit performs the mathematical-morphology-based conversion while scanning the document image by using a plurality of structuring elements, and thereby generates a plurality of conversion results of each of the background texture patterns; and
the information identification unit identifies the information represented by each of the background texture patterns by combining the plurality of conversion results of each of the background texture patterns.

15. The digital watermark detecting apparatus according to claim 12, wherein:
the mathematical-morphology-based conversion unit performs a mathematical-morphology-based conversion while scanning the document image by using a prescribed structuring element, and thereby extracts a region not having a dot from each of the background texture patterns; and
the information identification unit identifies information represented by each of the background texture patterns on the basis of position information of the extracted region in each of the background texture patterns.

16. The digital watermark detecting apparatus according to claim 15, wherein:

the information identification unit divides a conversion result of each of the background texture patterns into a plurality of blocks, and obtains the position information on the basis of a number of regions not having a dot included in each of the blocks.

17. The digital watermark detecting apparatus according to claim 15, wherein:
the mathematical-morphology-based conversion unit performs the mathematical-morphology-based conversion while scanning the document image by using a plurality of structuring elements, and thereby generates a plurality of conversion results of each of the background texture patterns; and
the information identification unit identifies the information represented by each of the background texture patterns by combining the plurality of conversion results of each of the background texture patterns.

18. The storage medium according to claim 2, wherein:
each of the plurality of background texture patterns includes the same number of dots.

* * * * *